No. 647,273. Patented Apr. 10, 1900.
W. S. MENDENHALL.
ICE CREAM FREEZER.
(Application filed July 31, 1899.)
(No Model.)

Witnesses
Oliver B. Kaiser
C. W. Miles

Inventor
W. S. Mendenhall
by Wood, Boyd & Wood
Attorneys

THE NORRIS PETERS CO., PHOTO-LITHO., WASHINGTON, D. C.

UNITED STATES PATENT OFFICE.

WALTER S. MENDENHALL, OF NORWOOD, OHIO.

ICE-CREAM FREEZER.

SPECIFICATION forming part of Letters Patent No. 647,273, dated April 10, 1900.

Application filed July 31, 1899. Serial No. 725,581. (No model.)

*To all whom it may concern:*

Be it known that I, WALTER S. MENDENHALL, residing at Norwood, in the county of Hamilton and State of Ohio, have invented certain new and useful Improvements in Ice-Cream Freezers, of which the following is a specification.

My invention relates to an ice-cream freezer, the features of which are more fully set forth in the description of the accompanying drawings, forming a part of this specification, in which—

Figure 1:
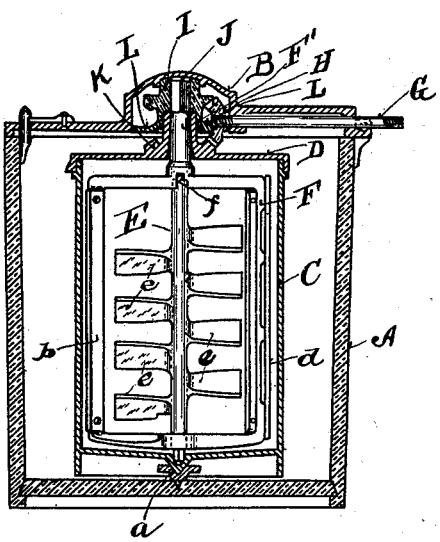
Figure 3:
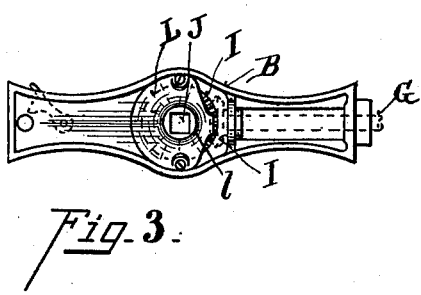
Figure 2:
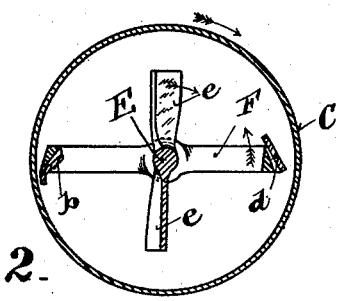
Figure 4:
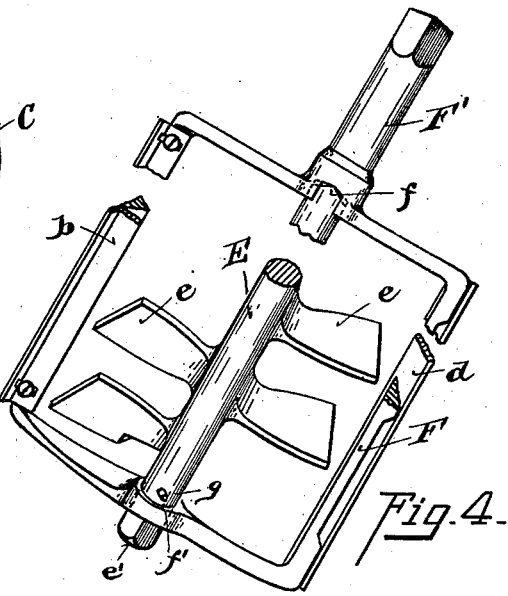

Figure 1 is a central vertical section of my freezer. Fig. 2 is a horizontal section through the can on line $x\ x$, Fig. 1. Fig. 3 is a bottom plan view of the hood. Fig. 4 is a perspective view of the stirring instrumentalities.

In order to understand the operation of my improved freezer, it will be necessary to consider the action of the cream in the operation of freezing, as that furnishes the conditions which must be mechanically provided for. The cream first freezes and adheres to the wall of the can, so that the first desideratum is to keep it scraped off clean and fine, which saves time and facilitates the operation. When the frozen cream is scraped from the wall of the can, it falls into the fluid cream, and the whirling motion imparted to the cream by the stirring instrumentalities causes this scraped cream to roll up or ball, so that the second desideratum is to crush out these balls. The centrifugal force occasioned by the revolution of the can constantly throws out the cream to the can-wall, so that it is obvious if this wall is constantly scraped off in a fine flocculent mass the outlay of power required to revolve the can will not only be constant, but the more rapid the successive layers of cream are presented to the action of the ice against the can-wall the quicker the operation. The best freezers up to the date of this invention have failed to accomplish all three of these results combined. A revolving frame with vertical blades was commonly used with the object of scraping the sides; but generally wooden blades have been employed, and the blades have been pivoted, upon the assumption that they would spread out during revolution and engage against the wall of the can; but such has not been the result. As the cream freezes upon the wall of the can it forces the blades in the line of least resistance to the center of the can and the wooden blades skate over the frozen surface, rendering it more and more compact with each successive revolution and each successive degree of cold imparted to the cream, so that the can not only revolves harder and harder, but the cold generated by the melting ice in the bucket must traverse a constantly-thickening and more compact mass of frozen cream on the wall of the can. Thus a large per cent. of the utility of the ice is wasted, with a loss of time and constantly-increasing power. The cream produced by my freezer is of a uniform fine quality, free from lumps, and in condition to be eaten the minute the operation has ceased. My improved means for producing these results, together with other details of improvement relating merely to convenience and ease of operation, I will now describe with reference to the drawings.

A represents the freezer or bucket; B, the hood; C, the can; D, the can-top, and G the crank carried by the hood. The can is revoluble in the bucket and has its bearings in the bottom of the bucket and in the hood. The bottom of the can is slightly concave and has the central socket $a$. Within the can is the revoluble frame F, having a stub-axle F' projected through the can-top and into the hood, the end of this axle being square to fit a socket in the hood. This frame is provided, preferably, with two rigid vertical blades $b\ d$, of metal, revolving in vertical planes in proximity to the wall of the can. The first blade $b$ is a scraper or cutter blade and the second blade $d$ a crusher or spreader blade. These blades are inclined in opposite directions and rigidly supported by the frame. They are preferably made adjustable. The advancing edge of the blade $b$ is inclined toward the can-wall in revolution, and the advancing edge of the blade $d$ is inclined away from the wall of the can, so that as the frozen cream is scraped off the wall it is caught by the blade $d$ and squeezed or crushed between it and the can-wall into fine particles and again scraped off the wall by the scraper $b$. Preferably these blades $b\ d$ are separate pieces secured to the limbs of the frame and may be made adjustable. It is obvious that they could be made integral with the frame, if desired. I prefer to make these blades of aluminium on account of the lightness and non-corrosiveness of the material. Another advantage which these blades produce is where it is desired to make fruit-flavor creams, in which case if the fruit is simply sliced into the case these blades thoroughly cut and disintegrate the fruit and mix it thoroughly through the cream.

Within the can and centrally pivoted within the frame is a revoluble shaft E, having inclined blades $e$ extended therefrom, forming a dash. The upper end of shaft E is journaled in the central bearing $f$, formed in the shoulder of the frame F or the under end of shaft portion F'. The lower end of shaft E projects through the orifice $f'$ in the lower shoulder of the frame F and rigidly engages the socket $a$ in the center of the can, so that this rod E must revolve with the can.

The object of making the bottom of the can slightly concave is that whenever the shaft E is lifted out of the socket it will be readily guided from any point in the bottom into its socket and one does not have to blindly grope for the socket. To assist the operation, a lug or point $e'$ is formed on the bottom end of shaft E. The shaft E is kept within the frame F by means of a pin $g$, passed through an orifice in shaft E, just above the lower shoulder of frame F. Thus the frame F turns on shaft E within the can and the shaft itself, with its blades, within the frame as it is revolved by the can. The frame and can are revolved in opposite directions by the following instrumentalites:

At the end of crank G, within the hood, is a bevel-gear H, meshing with the bevel-gear I, journaled in right-angled plane thereto in the top of the hood. This gear I has a socket J centrally located therein to fixedly engage the shaft F' of the frame F, thus revolving the frame with the gear-wheel I. Fixed to the top of the can is another bevel-gear K in right-angular plane with gear H and in mesh with the under edge thereof. Therefore as crank G is revolved gear I turns the frame F in one direction and the can and its supported shaft E in the opposite direction, as indicated by arrows, Fig. 2. To facilitate the operation of engaging the end of shaft F' into the socket J in the gear-wheel I, I provide a concave guide-plate L, having an orifice $l$ registering with the socket, so that in moving the hood down this plate readily catches the end of shaft F' and guides it into its socket. This guide-plate and the concave can-bottom greatly expedite and facilitate the operations of getting the shafts into their socket. In previous freezers employing two stirring instrumentalities revolved in opposite directions ordinarily power was applied to the top of both of them and transmitted through one of them to the bottom of the can, thus using the smallest leverage and applying it at the farthest extremity from the power. I apply the power directly to the top of the can and make the can revolve the stirring instrumentality socketed therein, which results in a great saving of power and consequent ease of operation and quickness of result, thus gaining not only a shorter leverage, but the gear on the can gives a large periphery to which to apply the power. Owing to this improvement in the means for applying the power and the advantage previously described of cutting away the frozen cream as fast as it is formed on the walls of the can, the increase of power required from start to finish during the entire operation is practically imperceptible.

Having described my invention, I claim—

1. In an ice-cream freezer, the combination of a can and top, a stirring-shaft projected through the can-top and having a socketed end, a hood pivoted to the can, a central housing on the hood, a bevel-gear journaled in the housing having a central socket to receive the shaft end, a concave plate secured in the housing under the bevel-gear having a guide-orifice opposite the socket in the gear adapted to automatically center said shaft in said socket when the hood is attached to the bucket and means for actuating said gear, substantially as specified.

2. In an ice-cream freezer, the combination of a can and top, a stirring-shaft projected through the said top, a hood straddling the can, a central housing in the hood, a bevel-gear journaled in the housing bearing against the hood-top, having a central socket, a concave guide-plate having a central orifice opposing the socket in the bevel-gear, the said plate being secured in the housing with its convex face abutting the under side of the bevel-gear and means for actuating said gear, substantially as specified.

3. In an ice-cream freezer, the combination of a hood straddling the can-top, a central housing in the hood, a bevel-gear having a central socket, a concave guide-plate having an orifice abutting the said socket, the said bevel-gear having an upper bearing in the housing-top and an under bearing against the convex side of said guide-plate and means for actuating said gear, substantially as specified.

4. In an ice-cream freezer, the combination of a hood pivoted to the bucket and straddling the can-top, a stem projecting through said top, a central housing in the hood, a bevel-gear having a central socket, a concave guide-plate having a guide-orifice registering with the socket in the gear, the said plate being secured in the housing, the bevel-gear having an upper bearing in the top of the housing and an under bearing against the convex side of said plate, means mounted on the housing for actuating said gear whereby when the hood is turned downward on its pivot the plate will catch the stem projected through the can-top and guide it into the socket automatically, substantially as specified.

5. In an ice-cream freezer, the combination of a hood pivoted to one side of the bucket and straddling the can-top, a stem projected through said top, a central housing on the hood, having a central socket, a segmental guide-plate having a central guide-orifice registering with said socket, the plate being secured in the housing, the gear having a top bearing in the housing and a bottom bearing against the convex face of said plate, a crank having a bevel-gear in the housing meshing with said housing-gear, the said plate having a shoulder forming an end bearing for the central portion of the bevel-gear on said shaft, substantially as specified.

6. In an ice-cream freezer, the combination of a can-top having an upwardly-extended integral sleeve, a stirring-shaft projected through the same, a hood straddling said can-top, a central housing in the hood, a gear having a central socket, the said gear having an upper bearing in said housing, a concave guide-plate having an orifice registering with said socket, the plate being attached in the housing and securing the gear in position, the gear having an annular bearing-surface concentric with the socket, the sleeve and stem projecting through the orifice in the plate, the end of the sleeve bearing against said annular bearing on the under face of said gear, and the stem engaging said socket, and means for actuating said gear, substantially as specified.

7. In an ice-cream freezer, the combination of a can-top having an upwardly-extended integral sleeve, a stirring-shaft projected through the same, a hood straddling the can-top, a central housing therein, a gear having a central socket, the said gear having an upper bearing in said housing-top, a concave guide-plate having an orifice registering with said socket, the plate being attached in the housing and securing said gear in position, the gear having an annular bearing on its under face concentric with said socket for the can-sleeve top end and for the convex abutting side of the plate, the sleeve and stem projecting through the orifice in the plate and engaging respectively the bearing and socket in the groove, substantially as specified.

In testimony whereof I have hereunto set my hand.

WALTER S. MENDENHALL.

Witnesses:
OLIVER B. KAISER,
W. R. WOOD.